United States Patent
Culver et al.

(10) Patent No.: US 8,822,064 B2
(45) Date of Patent: Sep. 2, 2014

(54) MODULAR BATTERY WITH POLYMERIC COMPRESSION SEALING

(75) Inventors: Duncan Culver, Howell, NJ (US); Christopher K. Dyer, Madison, NJ (US); Michael L. Epstein, Bedminster, NJ (US)

(73) Assignee: Lightening Energy, Dover, NJ (US)

( * ) Notice: Subject to any disclaimer, the term of this patent is extended or adjusted under 35 U.S.C. 154(b) by 752 days.

(21) Appl. No.: 12/650,773

(22) Filed: Dec. 31, 2009

(65) Prior Publication Data

US 2011/0159351 A1    Jun. 30, 2011

(51) Int. Cl.
| | |
|---|---|
| *H01M 2/26* | (2006.01) |
| *H01M 2/28* | (2006.01) |
| *H01M 2/02* | (2006.01) |
| *H01M 2/08* | (2006.01) |

(52) U.S. Cl.
USPC ............ 429/161; 429/167; 429/171; 429/172; 429/185

(58) Field of Classification Search
USPC ......... 429/185, 151, 152, 174, 457, 511, 161, 429/167, 171, 172
See application file for complete search history.

(56) References Cited

U.S. PATENT DOCUMENTS

| | | | |
|---|---|---|---|
| 3,056,850 A | 10/1962 | Rauske | |
| 3,844,841 A | 10/1974 | Baker | |
| 4,957,829 A | 9/1990 | Holl | |
| 5,256,502 A | 10/1993 | Kump | |
| 5,346,786 A | 9/1994 | Hodgetts | |
| 5,393,617 A | 2/1995 | Klein | |
| 5,429,643 A | 7/1995 | Lund et al. | |
| 5,552,243 A | 9/1996 | Klein | |
| 5,582,937 A * | 12/1996 | LaFollette | 29/623.1 |
| 5,595,839 A | 1/1997 | Hossain | |
| 6,040,085 A | 3/2000 | Cheu et al. | |
| 6,086,643 A * | 7/2000 | Clark et al. | 29/623.2 |
| 6,492,053 B1 | 12/2002 | Donelson et al. | |
| 6,500,319 B2 | 12/2002 | LaConti et al. | |
| 6,517,967 B1 | 2/2003 | Shrim et al. | |
| 6,887,620 B2 | 5/2005 | Klein et al. | |
| 7,163,761 B2 | 1/2007 | Debe et al. | |
| 7,462,416 B2 | 12/2008 | Kim | |
| 2001/0049054 A1 | 12/2001 | Enomoto et al. | |
| 2002/0136946 A1 | 9/2002 | Amatucci et al. | |

(Continued)

FOREIGN PATENT DOCUMENTS

| | | |
|---|---|---|
| JP | 2007-299680 | 11/2007 |
| WO | WO 03/096441 A2 | 11/2003 |
| WO | WO 2007086495 A1 | 8/2007 |

OTHER PUBLICATIONS

International Search Report from PCT/US2009/001791 (corresponds to US 2009/0239130 A1).

(Continued)

*Primary Examiner* — Patrick Ryan
*Assistant Examiner* — Julian Anthony
(74) *Attorney, Agent, or Firm* — Davidson, Davidson & Kappel, LLC

(57) ABSTRACT

A modular battery includes: a first battery cell having a first electrode surface; a second battery cell having a second electrode surface; a compressible interconnector connecting the first battery cell and the second battery cell; and a polymeric material holding the first battery cell against the second battery cell with the interconnector in a compressed state. A method is also provided.

31 Claims, 3 Drawing Sheets

(56) References Cited

U.S. PATENT DOCUMENTS

| | | |
|---|---|---|
| 2003/0013009 A1 | 1/2003 | Dansui et al. |
| 2003/0013015 A1 | 1/2003 | Klein et al. |
| 2003/0194605 A1 | 10/2003 | Fauteux et al. |
| 2004/0038123 A1 | 2/2004 | Hisamitsu et al. |
| 2004/0096724 A1 | 5/2004 | Debe et al. |
| 2005/0089751 A1 | 4/2005 | Oogami et al. |
| 2005/0214638 A1 | 9/2005 | Asahina et al. |
| 2006/0057433 A1 | 3/2006 | Ando et al. |
| 2006/0083986 A1 | 4/2006 | Li et al. |
| 2006/0121342 A1 | 6/2006 | Sano et al. |
| 2006/0188776 A1 | 8/2006 | Aker et al. |
| 2006/0203429 A1 | 9/2006 | Thrap et al. |
| 2006/0292443 A1* | 12/2006 | Ogg et al. .................. 429/185 |
| 2007/0015047 A1 | 1/2007 | Hosaka et al. |
| 2007/0026739 A1 | 2/2007 | Kim et al. |
| 2007/0128472 A1 | 6/2007 | Tierney |
| 2007/0158574 A1 | 7/2007 | Petrillo et al. |
| 2008/0070102 A1 | 3/2008 | Watanabe |
| 2008/0070106 A1 | 3/2008 | Hock et al. |
| 2008/0090136 A1 | 4/2008 | Kim et al. |
| 2008/0131764 A1* | 6/2008 | Saiki ........................... 429/149 |
| 2008/0266752 A1 | 10/2008 | Thrap et al. .................. 361/502 |
| 2008/0318133 A1 | 12/2008 | Matsuyama et al. |
| 2009/0239130 A1 | 9/2009 | Culver et al. |
| 2009/0305125 A1 | 12/2009 | Kosugi et al. |
| 2010/0104927 A1 | 4/2010 | Albright |
| 2010/0167116 A1 | 7/2010 | Okada |
| 2010/0273044 A1 | 10/2010 | Culver et al. |
| 2011/0159352 A1 | 6/2011 | Culver et al. |
| 2011/0177383 A1 | 7/2011 | Culver et al. |
| 2011/0200867 A1 | 8/2011 | Culver et al. |

OTHER PUBLICATIONS

International Search Report from PCT/US2010/001248 (corresponds to US 2010/0273044 A1).
International Search Report from PCT/US2010/003156 (corresponds to US 2011/0159352 A1).
International Search Report from PCT/US2011/000077 (corresponds to US 2011/0177383 A1).
International Search Report from PCT/US2011/000276 (corresponds to US 2011/0200867 A1).

\* cited by examiner

MODULAR BATTERY WITH POLYMERIC COMPRESSION SEALING

BACKGROUND

Modular batteries are batteries which comprise two or more battery cells or cell modules or cells. A common example of a device using a modular battery is a hand held flashlight which may use for example two C cells.

Recently, modular batteries have become important in many applications, including hybrid electric vehicles ("HEV"), plug-in hybrid electric vehicles ("PHEV"), and other applications. When used in HEV, PHEV, and other applications, in addition to being durable, safe and cost effective, modular batteries are required to deliver a great deal of power.

Applications of modular batteries, like the hand-held flashlight, require the use of multiple battery cells connected in series. However, the modular batteries for HEVs and PHEVs, for example, may differ from the modular C cells used in a common flashlight.

U.S. Patent Publication No. 2009-0239130 A1 discloses a modular battery with interconnectors, and is hereby incorporated by reference herein.

SUMMARY OF THE INVENTION

The present invention provides a modular battery comprising a first battery cell having a first electrode surface, a second battery cell having a second electrode surface, a compressible interconnector connecting the first battery cell and the second battery cell, and a polymeric material holding the first battery cell against the second battery cell with the interconnector in a compressed state.

The present invention also provides a method for forming a modular battery comprising: placing a compressible interconnector between a first battery cell having a first electrode surface and a second battery cell having a second electrode surface, placing a polymeric material at the peripheries of the first and second battery cells, compressing the compressible interconnector, and curing the polymeric material to hold the first battery cell with respect to the second battery cell so that the compressible interconnector remains in a compressed state.

BRIEF DESCRIPTION OF THE DRAWINGS

The present invention will be described with respect to a preferred embodiment, in which.

The drawings are schematic in nature and not to scale. For clarity and ease of understanding, some elements have been exaggerated in size.

DETAILED DESCRIPTION

In order to be powerful enough for HEVs, PHEVs, and other applications, it is desirable to use modular batteries containing cells with a high surface to volume ratio, for example using a planar design for each cell of the battery. These cells may be, for example, about the size of a large book wherein the "front" of the book contains, for example, a positive terminal (also known as an electrode) and the "back" of the book contains, for example, a negative terminal. Unlike their cylindrical counterparts (e.g., C cell batteries) which use a raised dimple at one end of a cell to make electrical contact with the next cylindrical cell, substantially planar cells need not have such raised dimple(s).

For many applications requiring high electrical power including HEVs and PHEVs, it is desirable that the battery delivers electrical power at a high voltage in order to reduce the required current needed to supply the electrical power which in turn will beneficially reduce the need for high-current carrying materials to the devices using the electrical power. Electrical power is the multiple of voltage and current and high voltage delivery of electrical power to a device, for example an electric motor, will require thinner or less conductive current carriers (for example copper wire) to the device which will reduce their cost. Electric vehicles for example may require a battery to provide electrical power at 300 to 600 volts. This high voltage is typically achieved by externally connecting multiple lower voltage battery modules electrically in series. This is in part due to safety considerations in assembling and operating a series connected "stack" of typical "pouch" cells within a battery module, since at higher voltages and especially above approximately 60 Volts, there is a significant risk of electrical arcing and a severe shock hazard since the edge peripheries of "flat" cells such as typical "pouch" cells have their cell terminals exposed. For safety these cell terminals are connected electrically in series within a low voltage battery module, for example, having less than 60 volts.

An object of the present invention is to provide sufficient pressure to ensure that battery modules retain good electrical contact. Another alternate or additional object of the present invention is to reduce the weight and/or cost and/or complexity of manufacturing of a modular battery. Yet a further alternate or additional object is provide for ease of disassembly for example for service or recycling.

The present invention may be used with the modular battery disclosed in incorporated-by-reference U.S. Patent Publication No. 2009-0239130 A1.

Figure 1:
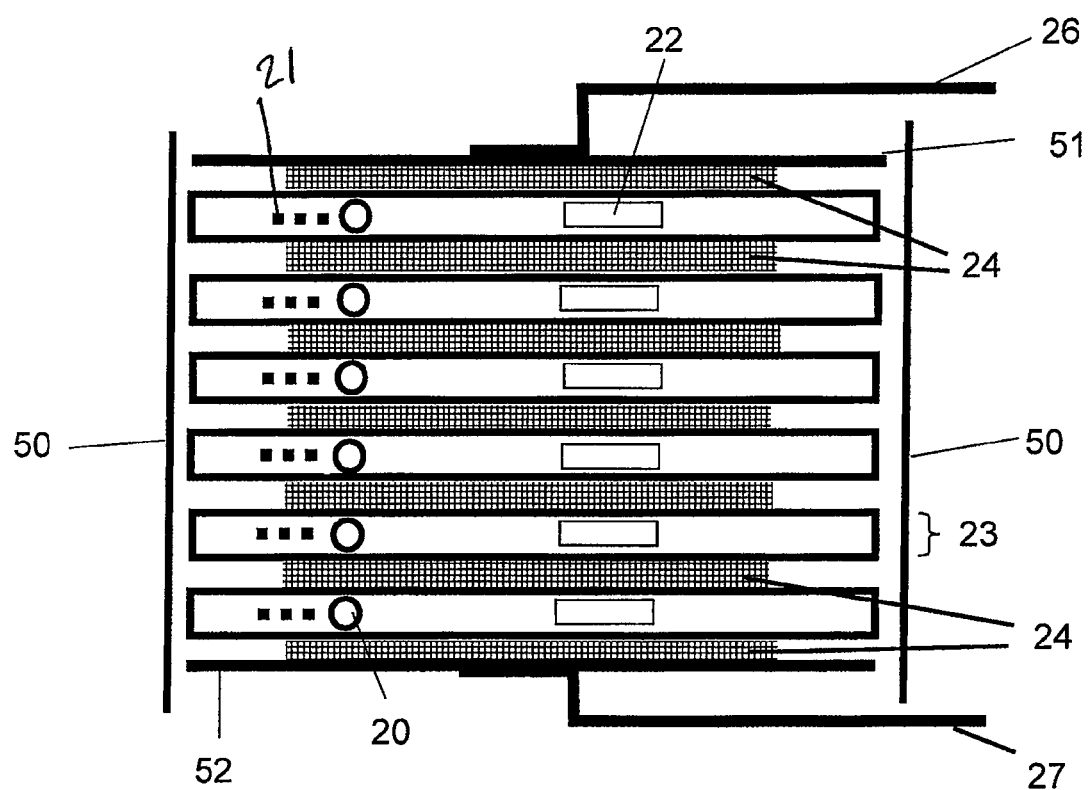
FIG. 1 schematically illustrates a step in manufacturing a modular battery according to one embodiment the present invention.

FIG. 1 shows six cell modules 23 stacked one on another electrically in series and separated by compressible interconnectors 24 which serve to electrically connect in series one cell module to the next cell module. Each module 23 may have a port 20 for an electrolyte, electrical feedthroughs 21 and burst disc 22 for pressure relief in the module 23. Further details of the cell modules are found in U.S. Patent Publication No. 2009-0239130 A1, although it is noted that other modules may be used in accordance with the present invention. Several compressible interconnectors 24 can be present between two cell modules, for example 8 layers, each 10 mils in thickness. Thus the space between cell modules for example can be 80 mils, and compressible to 60 mils when in use.

For the lowest electrical resistance between cell modules 23 in the battery stack, pressure should be applied to the interconnectors 24 between the cell modules 23. However, using the enclosure and springs described in U.S. Patent Publication No. 2009-0239130 A1 may not be advantageous from a cost and or manufacturing perspective.

According to one embodiment of the present invention, shrink wrapping can be used to provide and maintain the compression desired.

As shown in FIG. 1, a shrink wrap material 50, such as polyolefin or PVC, is provided, preferably as a rectangular cross-section tubular material around the periphery of the cell stack.

During manufacture, a compression device, such as a clamp, then can be used to compress the entire stack in FIG. 1, with a positive end plate 51 and a negative end plate 52, for example be placed at the ends of the stack. Either together with the compression device or afterward, a positive electrical terminal 26 can be placed over the one end cell module 23 or interconnector 24 and a negative power terminal 27 can connected over the other end cell module 23.

Once compressed, the shrink wrap can be shrunk, for example via a heat gun, so that the shrink wrap material shrinks in the direction of the axial center of the stack, to a new position as wrap 50a. The shrink wrap 50a overlaps the end plates 51, 52, and thus retains compression of the interconnectors 24. Spacing or connections for electrical feedthroughs 21 may also be provided prior to shrinking or post-shrinking, if desired.

The wrap 50a preferably is spaced from the peripheries of the interconnectors, but contacts the peripheries of the cell modules 23.

The shrink wrap material 50 should have electrically insulating properties if the shrink wrap material makes or becomes in contact with the interconnector 24 if the interconnector 24 is not itself electrically insulated at its periphery. The shrink wrap material 50 would beneficially be thermally conductive.

More than 50 cell modules may be wrapped, and preferably at least 20.

The embodiment of FIG. 1 provides a cost effective and simple manner for compression of the stack of cell modules, as well as hermetically sealing their enclosure. The shrink wrap also may reduce the weight of the cell stack and can be used efficiently in mass manufacturing. Instead of a heat gun, the cell stack also could pass with the wrap 50 through a heating device.

Figure 3:
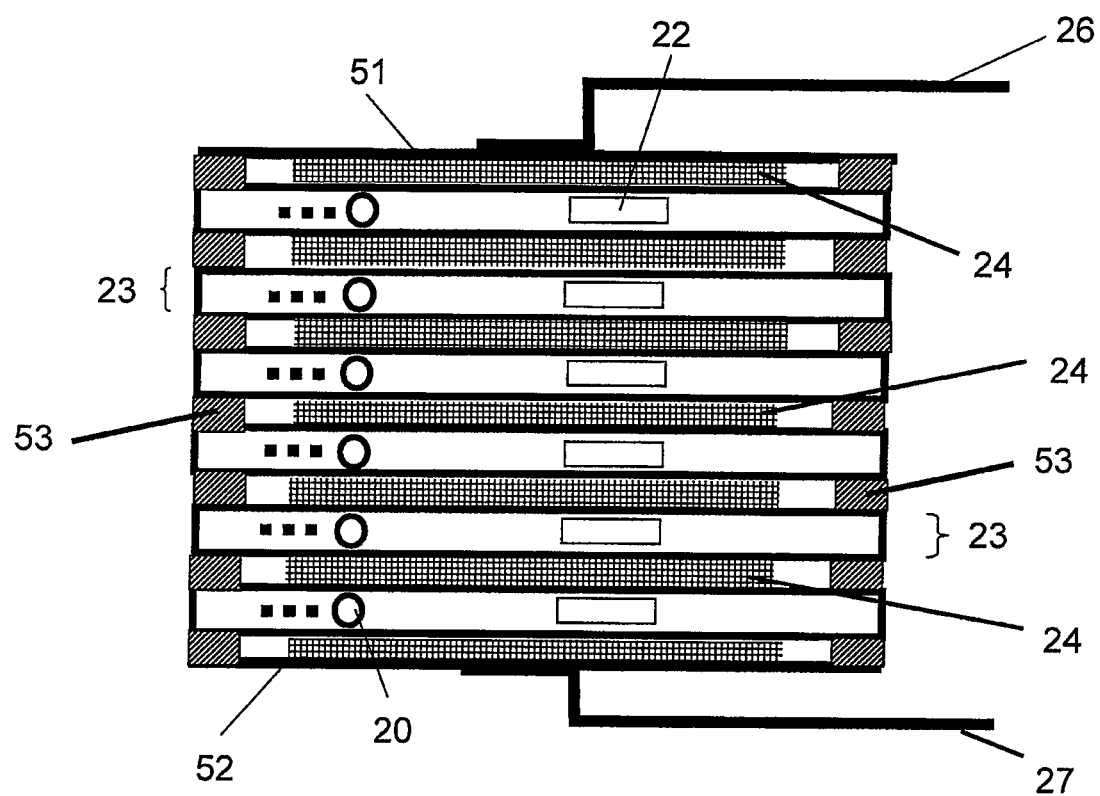
FIG. 3 shows an alternate embodiment of the present invention.

FIG. 3 shows an alternative embodiment of the present invention in which a sealant 53 is placed at the peripheries of the cell modules 23 and if present the end plates 51, 52. The sealant 53 can be spaced from a periphery of the interconnectors 24. The sealant 53 is located around the entire stack, so that the stack is completely sealed.

The sealant 53 can be applied in a liquid or viscous form, before or after the stack is compressed by a compression device. Strips or a ring of sealant 53 could also be placed as the stack is formed prior to compression. Once the stack is compressed and the sealant applied, the sealant 53 may be cured. Different sealants can be used depending on the adherence and sealing properties required, although preferred materials may include polyurethane or acrylic sealants. Heat, UV or other curing may be used depending on the sealant used. The adherence properties should ensure that a desired compression of the interconnectors remains after curing.

Figure 2:
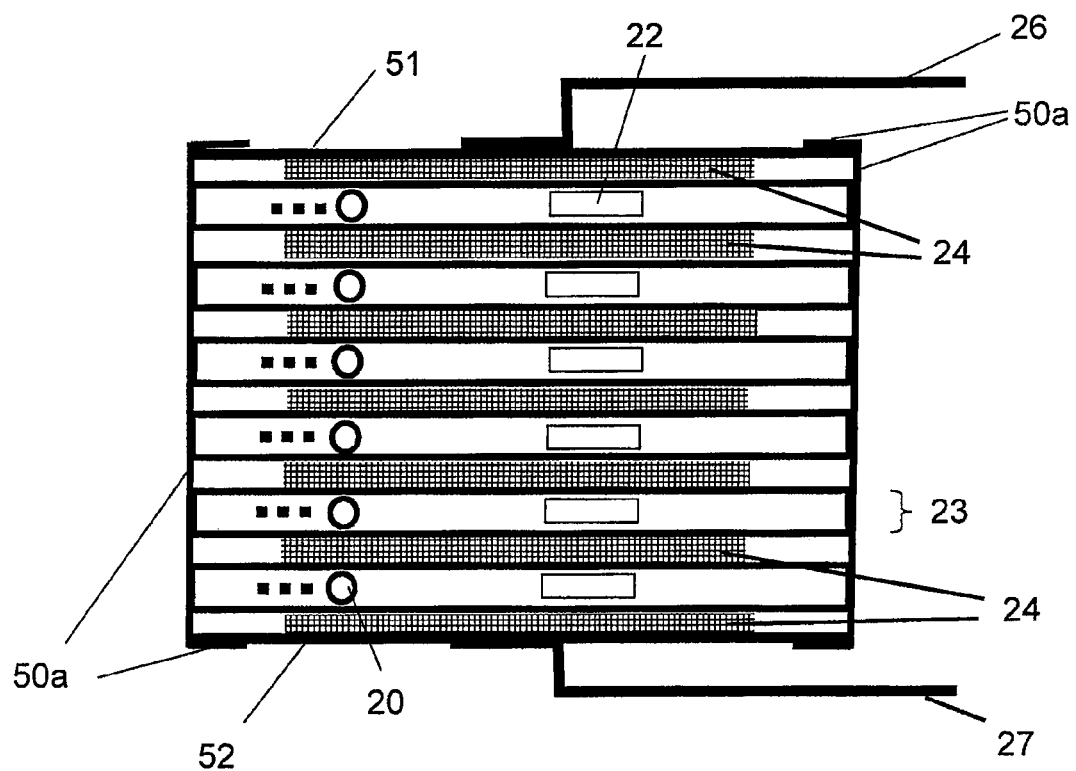
FIG. 2 schematically shows a completed modular battery following the FIG. 1 step.

In both examples shown in FIGS. 2 and 3 the interconnector 24 and cell modules 23 are easily accessible and removable for individual cell module replacement by cutting through the sealant 53 in FIG. 3 or the shrunken wrapping 50a in FIG. 2. This provides for easy recycling or service. Reassembly after individual cell module replacement can by accomplished by resealing by application of additional heat shrinkable wrapping and then heat shrinking as shown in FIG. 2 or in the arrangement illustrated in FIG. 3, applying additional sealant 53 to the upper and lower perimeters of the replacement cell module with the adjacent interconnectors under compression.

In addition, the compressed stacks from both embodiments in FIGS. 2 and 3 may be further housed in an insulating case, for example, an electrically insulating coating, bag or housing around the stacks shown in FIGS. 2 and 3.

It will be appreciated by those ordinarily skilled in the art that obvious variations and changes can be made to the examples and embodiments described in the foregoing description without departing from the broad inventive concept thereof. It is understood, therefore, that this disclosure is not limited to the particular examples and embodiments disclosed, but is intended to cover all obvious modifications thereof which are within the scope and the spirit of the disclosure as defined by the appended claims.

What is claimed is:

1. A modular battery comprising:
    a first battery cell having a first electrode surface;
    a second battery cell having a second electrode surface;
    a compressible interconnector connecting the first battery cell and the second battery cell; and
    a polymeric material holding the first battery cell against the second battery cell with the interconnector in a compressed state,
    wherein the interconnector electrically connects the first battery cell and the second battery cell in series.

2. The modular battery as recited in claim 1 wherein the polymeric material is a shrink-wrap material.

3. The modular battery as recited in claim 1 wherein the polymeric material is a sealant.

4. The modular battery as recited in claim 3 wherein the sealant is located between planar surfaces of the first and second battery cells.

5. The modular battery as recited in claim 1 wherein the polymeric material is electrically insulating.

6. The modular battery as recited in claim 1 wherein the polymeric material is thermally conducting.

7. The modular battery as recited in claim 1 further comprising a first end plate contacting the first battery cell, and a second end plate, the polymeric material contacting the first end plate and second end plate.

8. The modular battery as recited in claim 1 wherein the polymeric material seals a space between the first and second battery cells.

9. The modular battery as recited in claim 1 wherein the compressible interconnector is spaced at its periphery from the polymeric material.

10. The modular battery as recited in claim 1 further comprising further battery cells spaced by further interconnectors to form a stack, the stack being held in a compressed state by the polymeric material.

11. The modular battery as recited in claim 1 wherein the polymeric material holds the first battery cell against the second battery cell with the interconnector in a compressed state such that the resistance between the first battery and the second battery cell is lowered.

12. The modular battery as recited in claim 1 wherein the polymeric material is spaced from peripheries of the interconnector and contacting the peripheries of the first and second battery cells.

13. The modular battery as recited in claim 12 wherein the interconnector is compressed by a plurality of mils in thickness.

14. A method for forming a modular battery comprising:
    placing a compressible interconnector between a first battery cell having a first electrode surface and a second battery cell having a second electrode surface;
    placing a polymeric material at the peripheries of the first and second battery cells;

compressing the compressible interconnector; and curing the polymeric material to hold the first battery cell with respect to the second battery cell so that the compressible interconnector remains in a compressed state, wherein the compressing the compressible interconnector lowers the resistance between the first and second battery cells.

15. The method as recited in claim 14 wherein the polymeric material is a shrink-wrap material.

16. The method as recited in claim 15 wherein the polymeric material is at the peripheries at a distance, and then heated to shrink.

17. The method as recited in claim 14 wherein the polymeric material is a sealant.

18. The method as recited in claim 14 further comprising cutting through the polymeric material and reforming the modular battery by adding further polymeric material, compressing the compressible interconnector and curing the further polymeric material.

19. A modular battery comprising:
a first battery cell having a first electrode surface;
a second battery cell having a second electrode surface;
a compressible interconnector connecting the first battery cell and the second battery cell; and
a polymeric material holding the first battery cell against the second battery cell with the interconnector in a compressed state,
wherein the polymeric material holds the first battery cell against the second battery cell with the interconnector in a compressed state such that the resistance between the first battery and the second battery cell is lowered.

20. The modular battery as recited in claim 19 wherein the polymeric material is a shrink-wrap material.

21. The modular battery as recited in claim 19 wherein the polymeric material is a sealant.

22. The modular battery as recited in claim 21 wherein the sealant is located between planar surfaces of the first and second battery cells.

23. The modular battery as recited in claim 19 wherein the polymeric material is electrically insulating.

24. The modular battery as recited in claim 19 wherein the polymeric material is thermally conducting.

25. The modular battery as recited in claim 19 further comprising a first end plate contacting the first battery cell, and a second end plate, the polymeric material contacting the first end plate and second end plate.

26. The modular battery as recited in claim 19 wherein the polymeric material seals a space between the first and second battery cells.

27. The modular battery as recited in claim 19 wherein the compressible interconnector is spaced at its periphery from the polymeric material.

28. The modular battery as recited in claim 19 further comprising further battery cells spaced by further interconnectors to form a stack, the stack being held in a compressed state by the polymeric material.

29. The modular battery as recited in claim 19 wherein the polymeric material is spaced from peripheries of the interconnector and contacting the peripheries of the first and second battery cells.

30. The modular battery as recited in claim 29 wherein the interconnector is compressed by a plurality of mils in thickness.

31. The modular battery as recited in claim 19 wherein the interconnector electrically connects the first battery cell and the second battery cell in series.

* * * * *